Aug. 10, 1948.                    G. E. MERRITT                    2,446,843
                            LENS AND FILTER FOR CAMERAS
                                Filed Jan. 3, 1945

WITNESS
Esther M. Stockton

INVENTOR.
George E. Merritt
BY
Clinton L. Janes
ATTORNEY

Patented Aug. 10, 1948

2,446,843

UNITED STATES PATENT OFFICE 2,446,843

LENS AND FILTER FOR CAMERAS

George E. Merritt, Elmira Heights, N. Y., assignor to Bendix Aviation Corporation, South Bend, Ind., a corporation of Delaware Application January 3, 1945, Serial No. 571,125

3 Claims. (Cl. 88—57)

The present invention relates to a lens and filter for cameras, and more particularly to a lens system which is especially adapted for high altitude aerial reconnaissance cameras. The present application is a continuation in part of the application of Merritt and Jones, Serial Number 490,654, filed June 12, 1943, now Patent No. 2,397,031, dated March 19, 1946, which discloses such a lens system as an element of a continuous strip film type of aerial reconnaissance camera.

In high altitude aerial photography it is advantageous to use a very long focus lens in order to provide the necessary detail in the field of view without the necessity of greatly enlarging the photographic record. When such a lens is designed to embody the features usually incorporated in high class photographic lenses of moderate focal length, such as flatness of field and achromatism, however, it becomes very heavy and expensive, while the amount of light absorbed by the many thick glass elements and reflected by the many glass-air surfaces, cause the actual speed of the lens to be considerably less than is indicated by its F number. Thus, a good anastigmatic lens with a focal length of 60″ working at an effective aperature of F 6.3 weighs about 60 lbs. and embodies about 15 lbs. of expensive flint glass.

On the other hand, since the width of film which can be efficiently handled in an aerial camera is limited, it follows that the angle of view of a long focus lens which is actually utilized in such a camera is very small, so that correction of the lens to obtain flatness of field is unnecessary. Moreover, when pictures are taken at distances measured in miles from the object, it has been found that loss of definition due to the factors of aerial perspective can be reduced by the use of filters which transmit only a narrow band of visible light at the red end of the spectrum. This makes it unnecessary to correct the lens for chromatic aberration in respect to the remainder of the spectrum which is not used for taking the pictures.

The filter may be of the conventional dyed gelatin film type, in which case it is preferably cemented between the lens elements, or it may constitute one of the lens elements, by forming said element of properly colored glass. In the latter case, it has been found possible to improve the lens both as to color correction within the band which is utilized, and as to spherical aberration, by taking advantage of changes in the index of refraction caused by the coloration of the glass.

It is an object of the present invention to take advantage of the above considerations in order to provide a long focus photographic lens for aerial photography which is simple and economical in construction while being highly efficient for the intended purpose.

It is another object to provide such a lens having only two comparatively thin glass elements which may be cemented together so that the entire lens has only two glass-air surfaces.

It is another object to provide such a lens which may be composed entirely of crown glass.

It is another object to provide such a lens in which the adjacent surfaces of the two elements are flat so that a sheet filter may readily be cemented within the combination.

It is another object to provide such a lens in which one of the lens elements may be formed of colored glass so as to constitute both a lens element and a filter.

Further objects and advantages will be apparent from the following description taken in connection with the accompanying drawing in which.

Figure 1:
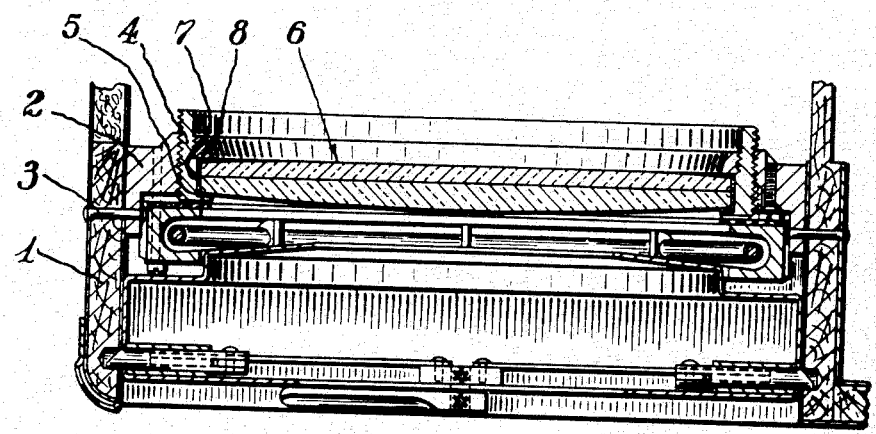
Fig. 1 is a vertical substantially mid-sectional view of a lens constructed in accordance with the present invention and supported by a suitable mount within the lens tube of an aerial camera.

In Fig. 1 of the drawing a portion of the body 1 of an aerial camera is illustrated having a cylindrical opening in which an internally threaded ring 2 is fixedly mounted in any suitable manner as by means of rivets 3. A lens cell or sleeve 4 is threaded within the ring 2 and is provided with an internal flange 5 forming a seat for receiving the lens which is indicated generally by numeral 6. Bushing 7 is preferably arranged to surround the periphery of the lens, and a ring nut 8 is threaded within the cell 4 and arranged to press the lens firmly into its seat in the cell.

According to the present invention, the lens 6 is formed of two plano-convex elements 9, 10 placed with their flat sides in contact. Since the lens is not to be corrected for chromatic aberration, both elements thereof may be of crown glass and the curvatures of the convex surfaces are calculated merely to correct for spherical aberration; as an example of such a lens combination, the following formula has been found to provide a satisfactory lens of the above type having a focal length of 244 centimeters:

*Simple minimum spherical lens*

$r_1 = +146$ cm. (front)
$r_2 = -910$ cm.

| $\lambda=$ | $.670\mu$ | $.637\mu$ | $.606\mu$ |
|---|---|---|---|
| $N=$ | 1.5148 | 1.5156 | 1.5164 |

|  | Cm. |
|---|---|
| Diameter | 18 |
| Focal length | 244 |
| Thickness at center | 2 |

Figure 2:
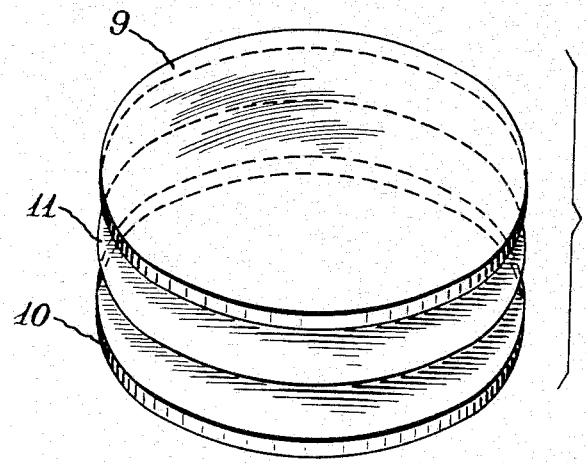
Fig. 2 is a detail in perspective of the lens, showing the glass elements and the filter element in disassembled relation.

As shown in Fig. 2, a gelatin filter element 11 may be interposed between the flat surfaces of the lens elements, and when the elements are cemented together, the filter is entirely protected from external influences except for the light which passes therethrough. It will be appreciated that the provision of flat inner surfaces of the lens elements facilitates the use of a sheet gelatin filter. If the filter is of the vaporized metal type, the only advantage in having the interior surfaces of the lens elements flat is that they are easier to form and polish.

According to the present invention, the filter used is one which passes only a narrow portion of the visible spectrum at the red end. In other words, the cut-off is quite sharp and is located near the lower limit of visibility. The limiting of the band on the longer wave length side has been accomplished by selecting that photograph material which is sensitive only to shorter wave lengths than the limit selected and the short wave length side of the band is defined by absorption of a filter which passes light only of a longer wave length than this edge of the band. A filter such as Wratten A has been found satisfactory for this purpose.

Figure 3:
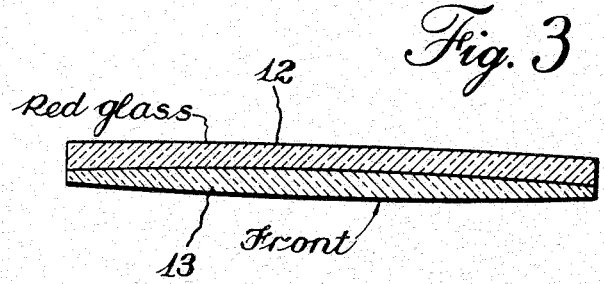
Fig. 3 is a sectional view of a lens constructed in accordance with the present invention in which one element of the lens constitutes the filter.

In the embodiment of the invention illustrated in Fig. 3 of the drawing, one of the lens elements is itself formed to constitute the filter. As there shown, the element 12 is formed of glass which has been colored to form the desired filtering medium by the addition of suitable quantities of coloring material such as a copper salt in the glass during its formation. The coloration of glass for this purpose in order to prepare plane glass filters having desired absorption bands is well known in the art.

It has been found that in any glass having strong absorption bands, there is a sharp increase in the dispersion on the longer wave length side of any such band. In the red glass which is used for filters employed in aerial photography, there is a strong absorption band, and since the part of the spectrum which is used for impressing the image on the photo-sensitive material is close to this band and on the longer wave length side, it is possible to utilize the increased dispersion of the glass to achromatize the comparatively narrow range of color passed by the filter and to which the photographic film used is sensitive. This is accomplished as shown in Fig. 3 by forming the highly dispersive colored glass filter 12 as a negative element, cemented to the positive element 13 of ordinary crown glass.

An example of a red band color-corrected lens constructed in accordance with the present invention is given by the following formula:

*Red band color corrected lens*

```
                                                    Cm.
Diameter_____  15.24
Focal length_____ 242.9
```

| Thickness | Center | Edge |
|---|---|---|
| $r_1 = +150$ cm. (front) | Cm. | Cm. |
| 1st element crown | .858 | .4 |
| $r_2 \atop r_3\} = -116$ cm. | | |
| 2nd element (red) | .6 | .812 |
| $r_4 = -856$ cm. | | |

Indices:
for $\lambda = .668\mu$   $.637\mu$   $.606\mu$
crown $N_1 = 1.5146$   $1.5156$   $1.5164$
Red crown $N_2 = 1.5052$   $1.5073$   $1.5089$ The result of this combination is an improvement in definition as compared to the type in which a sheet filter is incorporated in a split minimum spherical lens, not only because of the achromatization secured, but also by reason of the fact that there is a slight difference in the refractive indices of the red and white elements of the combination, which difference is available to further decrease the spherical aberration. In the above formula this difference is fully utilized, and effects a significant improvement.

It will be seen that applicant has taken advantage of the special conditions encountered in aerial photography as above set forth to provide an extremely simple, light, efficient and economical lens which will perform its specialized duties in a superior manner, while permitting the use of a light and convenient construction for the camera in which it is to be mounted. Although certains forms of the invention have been shown and described in detail, it will be appreciated that other forms and dimensions are possible, for example, a similar narrow band can be selected as above set forth in any part of the visible or invisible spectrum for which photo-sensitive materials are available, without departing from the spirit of the invention as defined in the claims appended hereto.

What is claimed is:

1. A lens for long-range photography comprising a positive element of colorless glass having a low dispersive power, and a negative element having identical original batch composition glass which is so colored as to form a red filter having a sharply defined absorption band adjacent the red portion of the spectrum, and having a comparatively high dispersive power in the red portion of the spectrum due to the addition of the coloring material to said glass composition, the focal length of the elements being so related that the dispersion of the negative element substantially neutralizes the dispersion of the positive element within said red portion of the spectrum, while the combination forms a converging lens of the desired focal length.

2. A lens for long-range photography comprising a first element of colorless crown glass, and a second element of red crown glass, the refractive indices of the glass forming the elements, being substantially as follows:

| | Millimicrons | | |
|---|---|---|---|
| For Wave Length | 668 | 637 | 606 |
| First Element (colorless) | 1.5146 | 1.5156 | 1.5164 |
| Second Element (red) | 1.5052 | 1.5073 | 1.5089 | in which the figure 1.5146 is the refractive index of the first (colorless) element of the lens for a wave length of 668 millimicrons, the figure 1.5052 is the refractive index of the second (red) element for the same wave length, etc. and the radii of curvature of the surfaces of the elements in order from front to back being substantially as follows:

$r_1 = +150$ cm.
$r_2 = -116$ cm.
$r_3 = -116$ cm.
$r_4 = -856$ cm.

in which $r_1$ is the radius of curvature of the front surface of the first element; $r_2$ is the radius of curvature of the back surface of the first element; $r_3$ is the radius of curvature of the front surface of the second element; and $r_4$ is the radius of curvature of the back surface of the second element.

3. A lens as set forth in claim 1 which is further characterized in that it is corrected solely for spherical aberration.

GEORGE E. MERRITT.

REFERENCES CITED

The following references are of record in the file of this patent:

UNITED STATES PATENTS

| Number | Name | Date |
|---|---|---|
| 740,484 | Stocoum | Oct. 6, 1903 |
| 970,111 | Ramstein et al. | Sept. 13, 1910 |
| 1,003,064 | Phillips | Sept. 12, 1911 |
| 1,182,485 | Hood | May 9, 1916 |
| 1,446,634 | Bell et al. | Feb. 27, 1923 |
| 1,469,931 | Davison | Oct. 9, 1923 |
| 1,470,512 | Tromba | Oct. 9, 1923 |
| 1,590,448 | Shore | June 29, 1926 |
| 1,629,361 | Polack | May 17, 1927 |
| 1,637,917 | Richter | Aug. 2, 1927 |
| 1,643,865 | Weidert | Sept. 27, 1927 |
| 2,275,602 | Beck | Mar. 10, 1942 |

FOREIGN PATENTS

| Number | Country | Date |
|---|---|---|
| 257,507 | Great Britain | Sept. 2, 1926 |
| 408,995 | France | Feb. 5, 1910 |